(12) United States Patent
Irie et al.

(10) Patent No.: US 10,434,591 B2
(45) Date of Patent: Oct. 8, 2019

(54) WIRE ELECTRIC DISCHARGE MACHINE INCLUDING UNIT FOR ADJUSTING ATTACHMENT POSITION OF WORKPIECE

(71) Applicant: FANUC Corporation, Yamanashi (JP)

(72) Inventors: Shouta Irie, Yamanashi (JP); Kaoru Hiraga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/080,736

(22) Filed: Mar. 25, 2016

(65) Prior Publication Data

US 2016/0279724 A1 Sep. 29, 2016

(30) Foreign Application Priority Data

Mar. 27, 2015 (JP) ................... 2015-066378

(51) Int. Cl.
*B23H 11/00* (2006.01)
*B23H 7/06* (2006.01)
(Continued)

(52) U.S. Cl.
CPC ............ *B23H 11/003* (2013.01); *B23H 1/00* (2013.01); *B23H 7/065* (2013.01); *G05B 19/402* (2013.01);
(Continued)

(58) Field of Classification Search
CPC ........ B23H 1/00; B23H 11/003; B23H 7/065; B23H 7/20; B23H 2500/20; G05B 19/402;
(Continued)

(56) References Cited

U.S. PATENT DOCUMENTS 4,050,293 A * 9/1977 Shimomura ........... G01B 5/285
33/501.02
4,960,971 A * 10/1990 Kawanabe ............... B23H 7/02
219/69.12
(Continued)

FOREIGN PATENT DOCUMENTS

JP 62-228325 A * 10/1987
JP 02-65923 A * 3/1990
(Continued)

OTHER PUBLICATIONS

Machine translation of Japan Patent document No. 2011-255,463, Jun. 2017.*
(Continued)

*Primary Examiner* — Geoffrey S Evans
(74) *Attorney, Agent, or Firm* — Hauptman Ham, LLP

(57) ABSTRACT

Provided is a wire electric discharge machine in which workpiece attaching and detaching unit attaches and detaches a workpiece to and from workpiece fixing unit, machining-reference-part detecting unit detects the position of a machining reference part of the workpiece, workpiece-positioning executing unit positions the workpiece in a position where the workpiece does not collide with machining-reference-part measuring unit, measurement-positioning executing unit positions the machining-reference-part measuring unit in a predetermined measurement start position, the machining-reference-part measuring unit measures the position of the machining reference part of the workpiece, and machining-reference-part-measurement executing unit executes a position measuring operation for the machining reference part of the workpiece using the machining-reference-part measuring unit.

8 Claims, 8 Drawing Sheets

(51) Int. Cl.
*B23H 7/20* (2006.01)
*G05B 19/402* (2006.01)
*B23H 1/00* (2006.01)

(52) U.S. Cl.
CPC ............ *B23H 7/20* (2013.01); *B23H 2500/20* (2013.01); *G05B 2219/45043* (2013.01)

(58) Field of Classification Search
CPC ............................... G05B 2219/45043; G06T 2207/30164; G06T 1129/012; G06T 2219/2004
See application file for complete search history.

(56) References Cited

U.S. PATENT DOCUMENTS

| | | | | |
|---|---|---|---|---|
| 6,082,016 | A * | 7/2000 | Otani | B23Q 17/0957 33/628 |
| 6,195,905 | B1 * | 3/2001 | Cole | B23D 59/002 29/401.1 |
| 7,165,335 | B2 * | 1/2007 | McMurtry | G01B 5/004 33/503 |
| 7,513,027 | B2 * | 4/2009 | Boehm | B23P 15/02 29/27 C |
| 2010/0211206 | A1 | 8/2010 | Nara | |
| 2012/0223055 | A1 | 9/2012 | Kawahara et al. | |
| 2013/0138241 | A1 | 5/2013 | Arakawa et al. | |
| 2013/0211577 | A1 | 8/2013 | Yamane et al. | |
| 2013/0325164 | A1 | 12/2013 | Wwatanabe et al. | |
| 2015/0051727 | A1 | 2/2015 | Hasegawa | |
| 2018/0021870 | A1 * | 1/2018 | Murakawa | B23H 7/065 |

FOREIGN PATENT DOCUMENTS

| | | | |
|---|---|---|---|
| JP | 2-88117 A | | 3/1990 |
| JP | 03-49833 A | * | 3/1991 |
| JP | 2009-265023 A | | 11/2009 |
| JP | 2010-190633 A | | 9/2010 |
| JP | 2011-255463 A | * | 12/2011 |
| JP | 2012-179705 A | | 9/2012 |
| JP | 2013111691 A | | 6/2013 |
| JP | 2013163238 A | | 8/2013 |
| JP | 2013-215830 A | * | 10/2013 |
| JP | 2015-036181 A | * | 2/2015 |
| JP | 2015-36181 A | | 2/2015 |
| WO | WO-2013/045633 A | * | 4/2013 |

OTHER PUBLICATIONS

Machine translation of Japan Patent document No. 2013-215,830, May 2018.*
Machine translation of Japan Patent document No. 2015-036,181, May 2018.*
Decision to Grant a Patent in JP Application No. 2015-066378, dated Jul. 12, 2016.
Extended European Search Report in EP Application No. 16162203.0, dated Aug. 25, 2016.
Decision to Grant a Patent in KR Application No. 10-2016-0034477, dated Jul. 3, 2017.

* cited by examiner

POSITION TOUCH SENSOR IN PREDETERMINED POSITION

ROTATE ROTATING AXIS AND MEASURE CONTACT POSITION

DETECT POSITION OF
WORKPIECE

POSITION WORKPIECE
SUCH THAT TOUCH SENSOR
DOES NOT COLLIDE WITH
WORKPIECE

DETECT POSITION WITH VISION SENSOR

WIRE ELECTRIC DISCHARGE MACHINE INCLUDING UNIT FOR ADJUSTING ATTACHMENT POSITION OF WORKPIECE

RELATED APPLICATIONS

The present application claims priority to Japanese Patent Application Number 2015-066378, filed Mar. 27, 2015, the disclosure of which is hereby incorporated by reference herein in its entirety.

BACKGROUND OF THE INVENTION

1. Field of the Invention

The present invention relates to a wire electric discharge machine and, more particularly, to a wire electric discharge machine including unit for adjusting an attachment position of a workpiece.

2. Description of the Related Art

In recent years, cutting tools made of materials having high hardness such as a polycrystalline diamond (PCD) tool and a polycrystalline cubic boron nitride (PCBN) tool have been more often machined using wire electric discharge machines. The PCD tool or the PCBN tool cuts out a PCD material or a PCBN material serving as a material of a cutting tool from a PCD raw material or a PCBN raw material as chips. A brazing material is melted by a high-frequency induction device to braze the cut-out chips to a shank as cutting edges. The chips brazed to the shank are machined into a final shape and finished into a tool bit.

However, in a brazing process, the chips are positioned and fixed in a state in which the melted brazing material is intervened. Therefore, it is difficult to fix the chips in ideal positions in design without an error. Waviness often occurs on rake faces because of heat during the brazing and unevenness of the thickness of the chips. As a result, a rake face shape is often a shape having an error more or less compared with an ideal shape in design.

When the rake faces have an error, if machining is performed on a machining route created on the basis of the ideal shape, the error adversely affects shape accuracy of a workpiece and causes deterioration in accuracy of a tool, deterioration in tool life, and the like.

In order to solve the problem, Japanese Patent Application Laid-Open No. 2013-111691 and Japanese Patent Application Laid-Open No. 2013-163238 disclose methods of measuring rake faces before machining using a measuring device such as a touch sensor, correcting a machining program and a machining track on the basis of a result of the measurement, and performing more accurate machining.

Japanese Patent Application Laid-Open No. 2013-111691 discloses a technique for driving an X axis and a Y axis that move a touch sensor attached to an upper wire guide in the horizontal direction relatively to a cut tool, to a tool body of which a PCD chip is fixed, according to a program for measurement created on the basis of a machining program, positioning the touch sensor in a measurement position, lowering the distal end of a probe to rotation center height of a rotating axis through Z-axis movement for movement in the vertical direction and positioning the distal end, rotating the rotating axis in a direction in which rake faces of a cutting tool come into contact with the distal end, reading, into a control device, rotating axis coordinate information at a point in time when the contact is detected, regenerating the machining program on the basis of data of a rotating axis coordinate acquired according to the program for measurement, and discharge-machining the cutting tool in a position where rake face positions are measured.

Japanese Patent Application Laid-Open No. 2013-163238 discloses a technique for reading a machining program for machining a tool bit created in advance, creating a measuring program for sequentially measuring measurement points to be measured using a touch sensor on the basis of the machining program, measuring rake face height at the measurement points, storing data of the rake face height, selecting a calculation method for a correction amount, calculating the correction amount, determining whether the correction amount is smaller than a regulation value, and, if the correction amount is not smaller than the regulation value, correcting the machining program on the basis of the correction amount and, if the correction amount is smaller than the regulation value, correcting the machining program on the basis of the correction amount according to the selected method or creating a correction value database to be superimposed on a movement command of the machining program serving as a base.

FIG. 1 is a diagram showing the shape of a workpiece 5. FIGS. 2A and 2B are diagrams showing measurement by a touch sensor 6. The workpiece to which chips 3 are brazed as shown in FIG. 1 is attached to a fixing device including a rotating axis 1 using a device such as a robot that automatically attaches and detaches the workpiece. As described in the related art (Japanese Patent Application Laid-Open No. 2013-111691 and Japanese Patent Application Laid-Open No. 2013-163238), after rake faces 4 are measured by the touch sensor 6, the machining program is corrected and machining is started.

In this case, as shown in FIGS. 2A and 2B, after the workpiece 5 is attached to the rotating axis 1, first, the touch sensor 6 is positioned in a predetermined measurement position. Thereafter, the rotating axis 1 is rotated to bring the touch sensor 6 and the rake face 4 into contact with each other and perform position measurement. The workpiece 5 indicates a workpiece in which the chips 3 are welded to a body 2.

At this point, depending on the posture of the workpiece 5 attached to the rotating axis 1, when the touch sensor 6 is positioned in the predetermined position, in some case, the touch sensor 6 and the workpiece 5 collide with each other and the touch sensor 6 cannot be positioned in the measurement position as shown in FIG. 3. When the touch sensor 6 is positioned in the predetermined position, if moving speed is as high as possible, efficiency is higher because an arrangement time is reduced. However, in the position measurement of the rake face 4, detection accuracy is higher if relative speed of the touch sensor 6 and the workpiece 5 is lower.

Therefore, the relative speed of the workpiece 5 and the touch sensor 6 is different during the positioning and during the measurement. If the touch sensor 6 collides with the workpiece 5 at the speed during the positioning, the touch sensor 6 is likely to fail.

In this way, depending on the attachment position of the attached workpiece 5, the touch sensor 6 sometimes collides with the workpiece 5 when the touch sensor 6 is moved to the measurement position in the positioning of the touch sensor 6 as shown in FIG. 3. When the touch sensor 6 and the workpiece 5 collide with each other during the positioning of the touch sensor 6, problems such as a stop of the process and a failure of the touch sensor 6 occur.

When automatic replacement of the workpiece 5 is considered for improvement of productivity, if an attachment position of the automatically replaced workpiece 5 cannot be checked, it is likely that the touch sensor 6 and the workpiece 5 collide with each other and a stop of the process, a failure of the touch sensor 6, and the like occur as explained above. If the attachment position is manually checked, production cannot be automated.

The technique disclosed in Japanese Patent Application Laid-Open No. 2013-111691 relates to a wire electric discharge machine that measures rake faces of a tool, which is a workpiece, with a touch sensor and corrects a machining program on the basis of a result of the measurement to perform machining. Therefore, when the touch sensor is positioned in a measurement position, since an attachment position of a cutting tool is not taken into account, it is likely that the touch sensor and the cutting tool collide with each other depending on a position where the cutting tool is attached.

The technique disclosed in Japanese Patent Application Laid-Open No. 2013-163238 is a technique for measuring rake face height of a tool bit, which is a workpiece, with a touch sensor, calculating a correction amount, and correcting a machining program and correcting a movement command on the basis of the correction amount. However, like the technique of Japanese Patent Application Laid-Open No. 2013-111691, it is likely that the tool bit collides with the touch sensor depending on an attachment position of the attached tool bit.

SUMMARY OF THE INVENTION

Therefore, it is an object of the present invention to provide a wire electric discharge machine including positioning unit for positioning a machining reference part in a predetermined position such that a workpiece and machining-reference-part measuring unit for measuring an error with respect to an ideal shape of the machining reference part of the workpiece do not collide with each other.

A wire electric discharge machine according to the present invention includes: workpiece fixing unit disposed in a work tank in which a workpiece is machined and including a movable axis to which the workpiece is detachably attached; machining-reference-part detecting unit for detecting a position of a machining reference part of the workpiece detachably fixed to the workpiece fixing unit; executing unit for controlling the movable axis according to position information of the machining reference part detected by the machining-reference-part detecting unit, and positioning a position of the machining reference part in a predetermined position; machining-reference-part measuring unit for measuring an error of the machining reference part of the workpiece detachably fixed to the workpiece fixing unit; measurement-positioning executing unit for positioning the machining-reference-part measuring unit in a predetermined measurement position; and machining-reference-part-measurement executing unit for executing measurement of the machining reference part of the workpiece with the machining-reference-part measuring unit.

With the configuration of the present invention, it is possible to provide the wire electric discharge machine including positioning unit for positioning a machining reference part in a predetermined position such that a workpiece and machining-reference-part measuring unit for measuring an error with respect to an ideal shape of the machining reference part of the workpiece do not collide with each other.

The workpiece-positioning executing unit may perform the positioning of the workpiece by positioning the machining reference part detected by the machining-reference-part detecting unit in the predetermined position.

The workpiece-positioning executing unit may include collision determining unit for determining, from the position of the machining reference part detected by the machining-reference-part detecting unit and the predetermined measurement position of the machining-reference-part measuring unit positioned by the measurement-positioning executing unit, whether the machining reference part and the machining-reference-part measuring unit collide with each other. When the collision determining unit determines that the machining reference part and the machining-reference-part measuring unit collide with each other, the workpiece-positioning executing unit may perform the positioning of the workpiece by positioning the machining reference part in a position where the machining reference part does not collide with the machining-reference-part measuring unit.

A vision sensor can be used as the machining-reference-part detecting unit.

The wire electric discharge machine may further include workpiece attaching and detaching unit for attaching and detaching the workpiece to and from the movable axis of the workpiece fixing unit. The workpiece attaching and detaching unit may include the machining-reference-part detecting unit.

After the workpiece attaching and detaching unit attaches the workpiece to the movable axis of the workpiece fixing unit, the machining-reference-part detecting unit may detect the position of the machining reference part of the workpiece.

Before the workpiece attaching and detaching unit attaches the workpiece to the movable axis of the workpiece fixing unit, the machining-reference-part detecting unit may detect the position of the machining reference part of the workpiece and calculate, from the detected position of the machining reference part, the position of the machining reference part of the workpiece at a time when the workpiece is attached to the movable axis of the workpiece fixing unit.

The wire electric discharge machine may further include workpiece attaching and detaching unit for attaching and detaching the workpiece to and from the movable axis of the workpiece fixing unit. After the workpiece attaching and detaching unit attaches the workpiece to the movable axis of the workpiece fixing unit, the machining-reference-part detecting unit may detect the position of the machining reference part of the workpiece.

The wire electric discharge machine may further include workpiece attaching and detaching unit for attaching and detaching the workpiece to and from the movable axis of the workpiece fixing unit.

Before the workpiece attaching and detaching unit attaches the workpiece to the movable axis of the workpiece fixing unit, the machining-reference-part detecting unit detects the position of the machining reference part of the workpiece and calculates, from the detected position of the machining reference part, the position of the machining reference part of the workpiece at a time when the workpiece is attached to the movable axis of the workpiece fixing unit.

BRIEF DESCRIPTION OF THE DRAWINGS

The objects and the features described above and other objects and features of the present invention will be made clear from the following explanation of embodiments explained with reference to the accompanying drawings. Among the figures.

DESCRIPTION OF THE PREFERRED EMBODIMENTS

Figure 1:
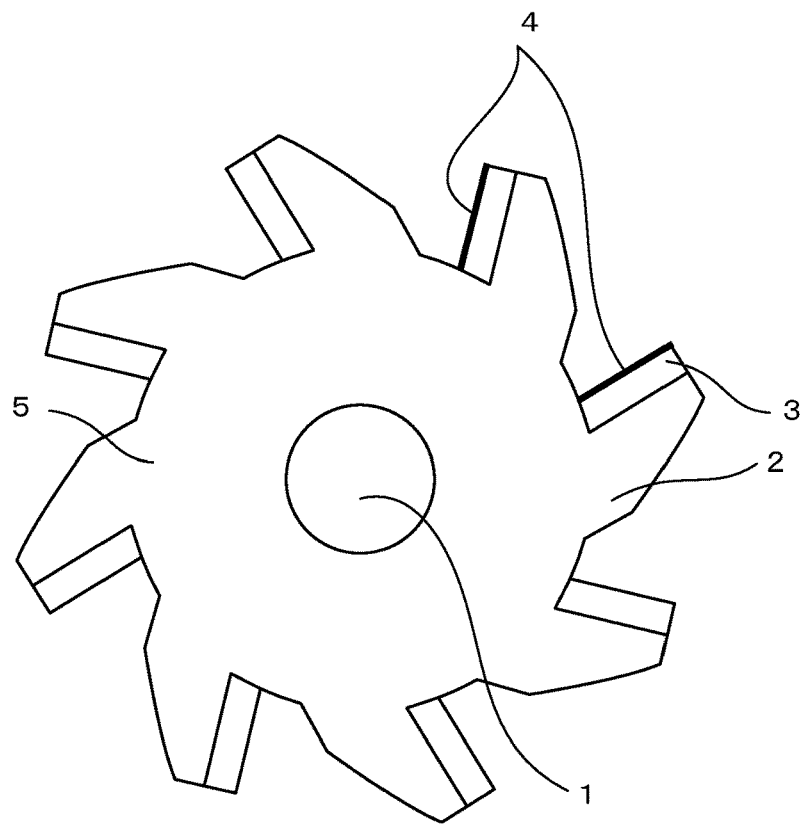
FIG. 1 is a diagram showing the shape of a workpiece.

Embodiments of the present invention are explained below with reference to the drawings. Note that components same as or similar to the components of the related art are explained using the same reference numerals and signs.

First Embodiment

Figure 5:
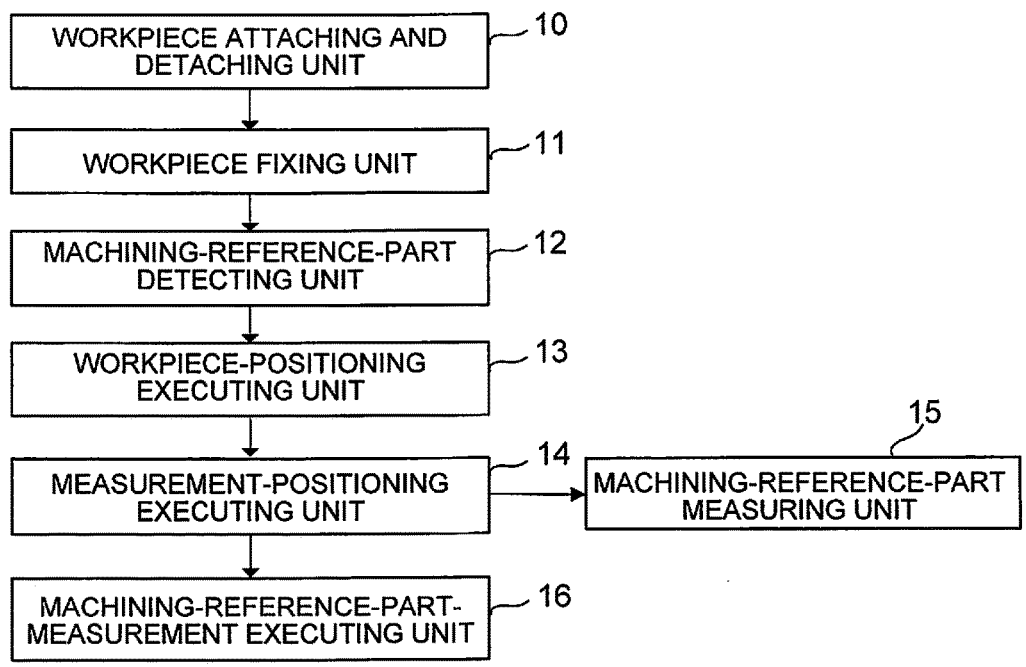
FIG. 5 is a block diagram showing a first embodiment.

FIG. 5 is a block diagram showing a first embodiment.

Workpiece attaching and detaching unit 10 is unit for attaching and detaching a workpiece 5 to and from workpiece fixing unit 11.

The workpiece fixing unit 11 is unit for setting the workpiece 5 on a table 42 of a wire electric discharge machine. The workpiece fixing unit 11 may include a movable axis such as a rotating axis. The workpiece 5 is detachably attached to the movable axis such as the rotating axis.

Machining-reference-part detecting unit 12 is unit for detecting the position of a machining reference part of the workpiece 5. Workpiece-positioning executing unit 13 is unit for positioning the workpiece 5 in a position where the workpiece 5 does not collide with machining-reference-part measuring unit 15. Measurement-positioning executing unit 14 is unit for positioning the machining-reference-part measuring unit 15 in a predetermined measurement start position. The machining-reference-part measuring unit 15 is unit for measuring the position of the machining reference part of the workpiece 5. Machining-reference-part-measurement executing unit 16 is unit for executing a position measuring operation for the machining reference part of the workpiece 5 using the machining-reference-part measuring unit 15.

Figure 9A:
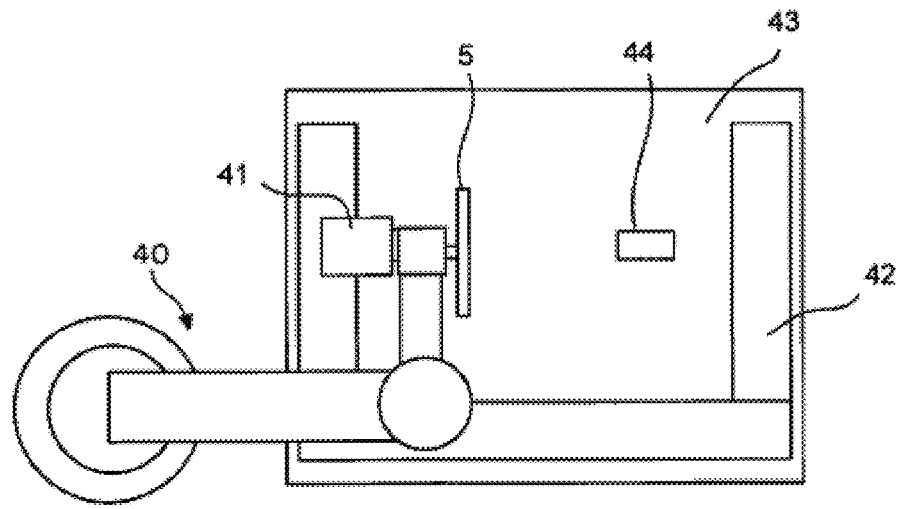
FIGS. 9A and 9B are diagrams for explaining the first and second embodiments.

The workpiece fixing unit 11 for fixing and setting the workpiece 5 is placed on the table 42 of the wire electric discharge machine. The workpiece attaching and detaching unit 10 attaches the workpiece 5 to the workpiece fixing unit 11. Specifically, an example is conceivable in which an industrial robot is used as the workpiece attaching and detaching unit 10 and the workpiece 5 is attached to a workpiece fixing jig 41 placed on the table 42 (see FIG. 9A). Note that the workpiece 5 includes a machining reference part equivalent to the rake face shown in FIG. 1. The workpiece fixing jig 41, which is the workpiece fixing unit 11, includes unit for detachably fixing the workpiece 5 such as a rotating axis.

Figure 9B:
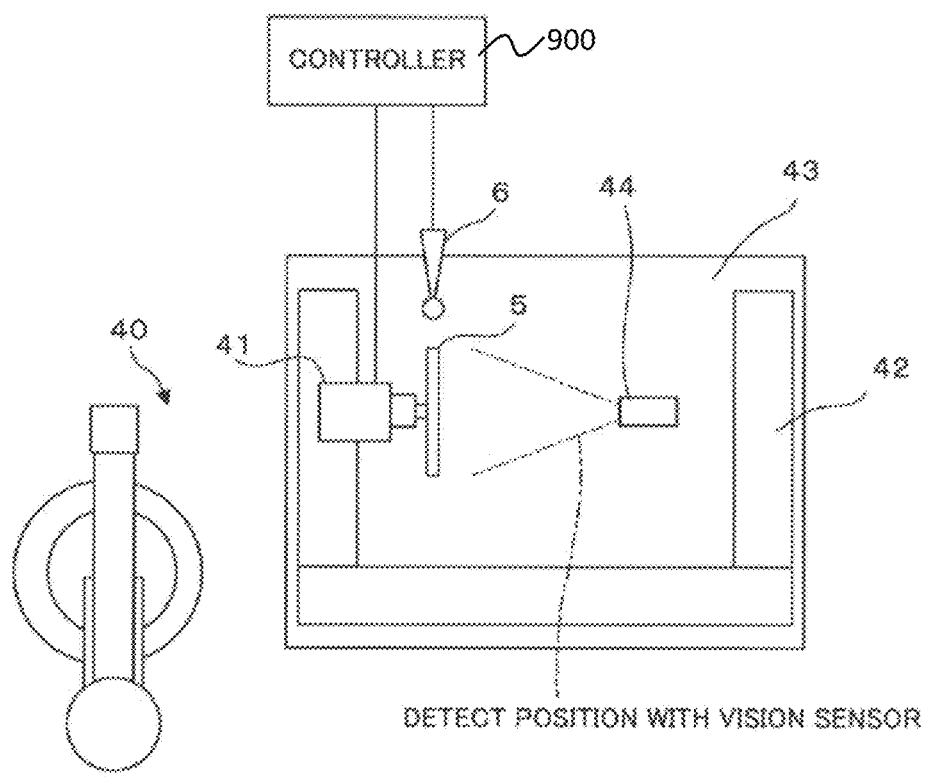

After the workpiece 5 is fixed to the workpiece fixing unit 11, the machining-reference-part detecting unit 12 detects the position of the machining reference part of the workpiece 5 fixed to the workpiece fixing unit 11. Specifically, an example is conceivable in which a vision sensor (44, FIG. 9B) is used as the machining-reference-part detecting unit 12 and the position of a rake face, which is a machining reference, is detected from image data obtained by photographing the workpiece 5 (see FIG. 9B). After detecting the position of the machining reference part, the machining reference-part detecting unit 12 outputs information concerning the detected position of the machining reference part to the workpiece-positioning executing unit 13.

Figure 3:
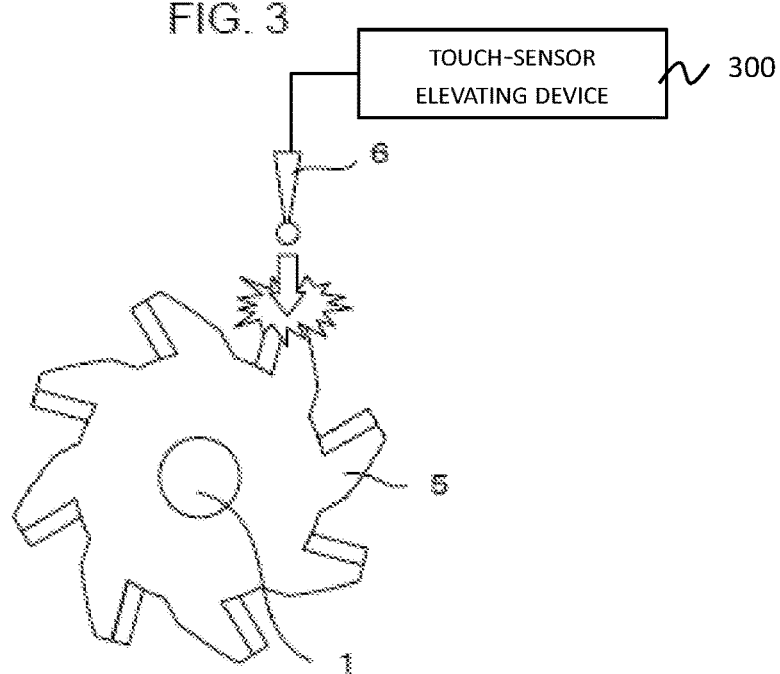
FIG. 3 is a diagram showing collision during positioning of the touch sensor.
Figure 4A:
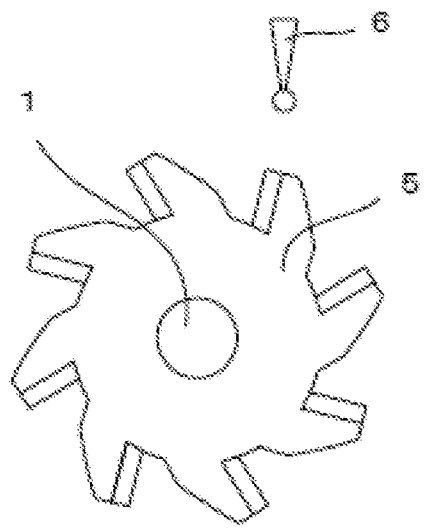
FIGS. 4A and 4B are diagrams for explaining the principle of the present invention.
Figure 4B:
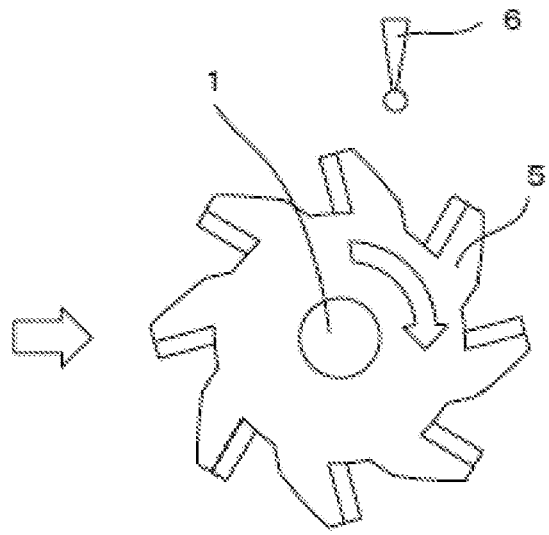

The workpiece-positioning executing unit 13, which has received the position information, positions the machining reference part of the workpiece 5 in a predetermined position on the basis of the position information. Thereafter, the measurement-positioning executing unit 14 positions the machining-reference-part measuring unit 15 in a measurement start position. Specifically, an example is conceivable in which the rotating axis of the workpiece fixing unit 11 (the workpiece fixing jig 41) rotates under control of a controller (900, FIG. 9B) of the wire electric discharge machine to move the rake face of the workpiece 5 to a predetermined position, and after the positioning of the workpiece 5 is completed using the touch sensor 6 (FIG. 9B) as the machining-reference-part measuring unit 15 and using a touch-sensor elevating device 300 (FIG. 3) as the measurement-positioning executing unit 14, the touch sensor 6, which is the machining-reference-part measuring unit 15, is lowered to the measurement start position by the measurement-positioning executing unit 14 (see FIGS. 4A and 4B).

Note that the predetermined position is a position where the workpiece 5 does not collide with the machining-reference-part measuring unit 15 positioned in the measurement start position. The predetermined position is decided in advance. The measurement start position is also decided in advance.

Figure 2A:
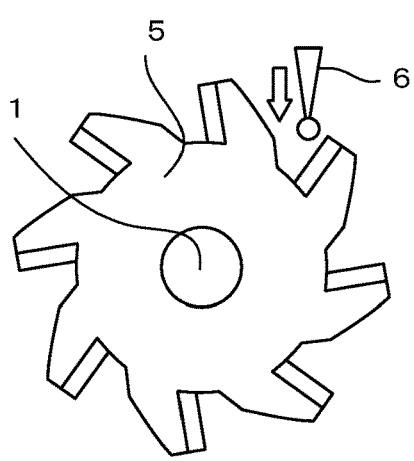
FIGS. 2A and 2B are diagrams showing measurement by a touch sensor.
Figure 2B:
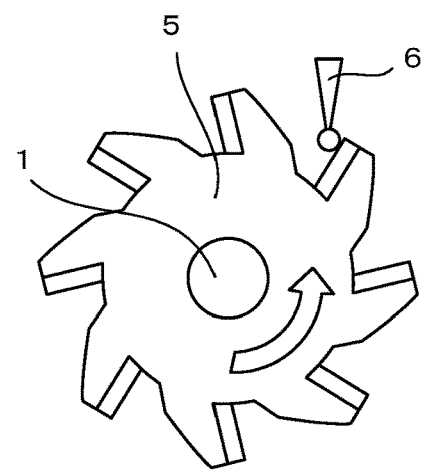

After the machining-reference-part measuring unit 15 is positioned in the measurement start position, the machining-reference-part measuring unit 15 executes a position measuring operation for the machining reference part of the workpiece 5. Specifically, an example is conceivable in which, when the rotating axis of the workpiece fixing jig 41, which is the workpiece fixing unit 11, rotates and the rake face of the workpiece 5 comes into contact with the touch sensor 6, the position of the rake face is measured (see FIGS. 2A and 2B).

Figure 6:
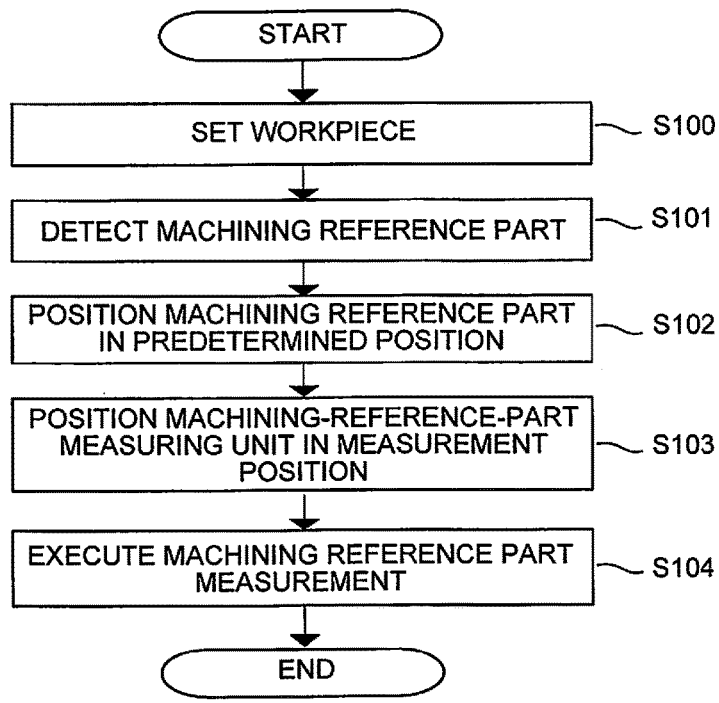
FIG. 6 is a diagram showing a flow of processing in the first embodiment.

FIG. 6 is a diagram showing a flow of processing in the first embodiment. The flow of the processing is explained according to steps.

[S100] The wire electric discharge machine fixes, with the workpiece attaching and detaching unit 10, the workpiece 5 to the workpiece fixing unit 11. The wire electric discharge machine shifts to S101.

[S101] The wire electric discharge machine detects, with the machining-reference-part detecting unit 12, the position of the machining reference part of the workpiece 5. The wire electric discharge machine shifts to S102.

[S102] The wire electric discharge machine positions, with the workpiece-positioning executing unit 13, the machining reference part of the workpiece 5 in a predetermined position. The wire electric discharge machine shifts to S103.

[S103] The wire electric discharge machine positions, with the measurement-positioning executing unit 14, the machining-reference-part measuring unit 15 in a predetermined measurement position. The wire electric discharge machine shifts to S104.

[S104] The wire electric discharge machine causes, with the machining-reference-part-measurement executing unit 16, the machining-reference-part measuring unit 15 to measure the position of the machining reference part of the workpiece 5, and ends the processing. Note that, by measuring the position of the machining reference part of the workpiece 5 with the machining-reference-part measuring unit 15, it is possible to calculate an error with respect to an ideal shape in design of the machining reference part of the workpiece 5 detachably fixed to the workpiece fixing unit 11.

Second Embodiment

Figure 7:
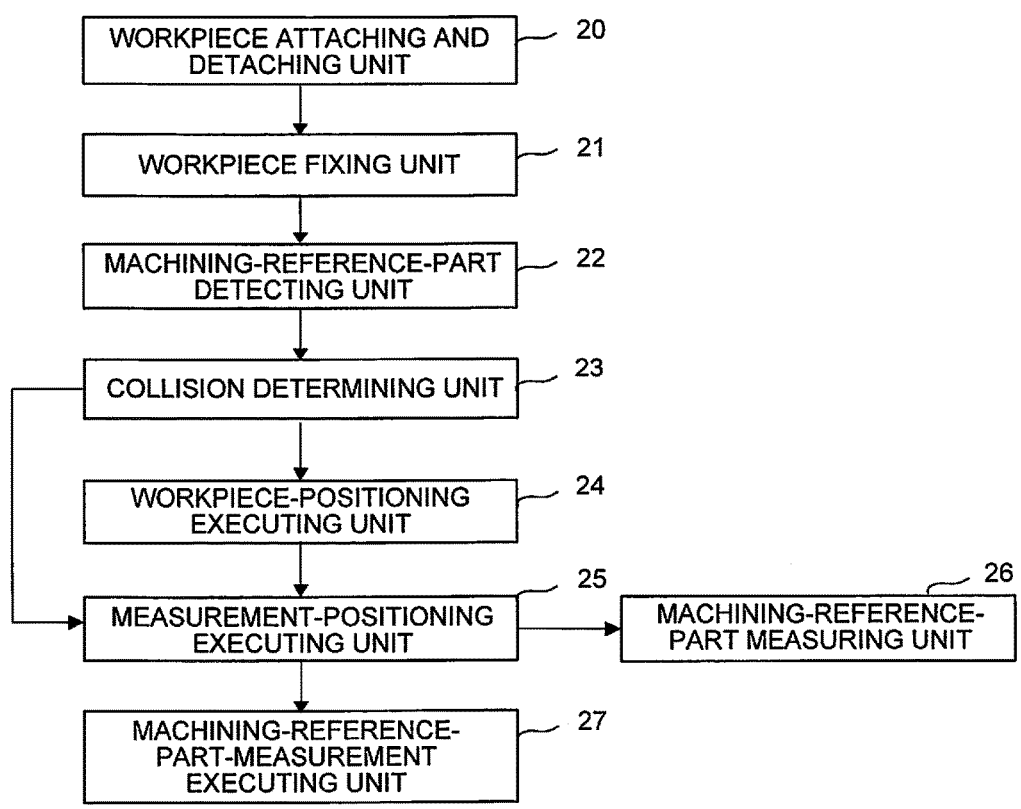
FIG. 7 is a block diagram showing a second embodiment.

FIG. 7 is a block diagram showing a second embodiment.

Workpiece attaching and detaching unit 20 is unit for attaching and detaching the workpiece 5 to and from workpiece fixing unit 21. The workpiece fixing unit 21 is unit for setting the workpiece 5 on the table 42 disposed in a work tank 43 of the wire electric discharge machine (see FIG. 9A). Machining-reference-part detecting unit 22 is unit for detecting the position of the machining reference part of the workpiece 5. Collision determining unit 23 is unit for determining, from the position of the machining reference part detected by the machining-reference-part detecting unit 22 and a predetermined measuring position positioned by machining-reference-part measuring unit 26, whether the machining reference part and the machining-reference-part measuring unit 26 collide with each other. Workpiece-positioning executing unit 24 is unit for positioning the workpiece 5 in a position where the workpiece 5 does not collide with the machining-reference-part measuring unit 26. Measurement-positioning executing unit 25 is unit for positioning the machining-reference-part measuring unit 26 in a predetermined measurement start position. The machining-reference-part measuring unit 26 is unit for measuring the position of the machining reference part of the workpiece 5. Machining-reference-part-measurement executing unit 27 is unit for executing a position measuring operation for the machining reference part of the workpiece 5 using the machining-reference-part measuring unit 26.

The workpiece fixing unit 21 for fixing and setting the workpiece 5 is placed on the table 42 of the wire electric discharge machine. The workpiece attaching and detaching unit 20 attaches the workpiece 5 to the workpiece fixing unit 21 and sets the workpiece 5. Specifically, an example is conceivable in which an industrial robot 40 is used as the workpiece attaching and detaching unit 20 and the workpiece 5 is attached to the workpiece fixing jig 41, which is the workpiece fixing unit 21, placed on the table 42 (see FIG. 9A). Note that the workpiece 5 includes the machining reference part equivalent to the rake face 4 shown in FIG. 1. The workpiece fixing jig 41, which is the workpiece fixing unit 21, includes workpiece positioning unit like the rotating axis 1.

After the workpiece 5 is set, the machining-reference-part detecting unit 22 detects the position of the machining reference part of the workpiece 5 set in the workpiece fixing unit 21. Specifically, an example is conceivable in which a vision sensor 44 is used as the machining-reference-part detecting unit 22 and the position of the rake face 4, which is a machining reference, is detected from image data obtained by photographing the workpiece 5 (see FIG. 9B). After detecting the position of the machining reference part, the machining-reference-part detecting unit 22 outputs information concerning the detected position of the machining reference part to the collision determining unit 23.

The collision determining unit 23 determines, from the position of the machining reference part of the workpiece 5 detected by the machining-reference-part detecting unit 22 and the predetermined measuring position positioned by the machining-reference-part measuring unit 26, whether the machining reference part and the machining-reference-part measuring unit 26 collide with each other. When determining that the machining reference part and the machining-reference-part measuring unit 26 collide with each other, the collision determining unit 23 outputs position information of the machining reference part to the workpiece-positioning executing unit 24. When determining that the machining reference part and the machining-reference-part measuring unit 26 do not collide with each other, the collision determining unit 23 notifies the measurement-positioning executing unit 25 that the machining reference part and the machining-reference-part measuring unit 26 do not collide with each other.

When the collision determining unit 23 determines that the machining reference part and the machining-reference-part measuring unit 26 collide with each other, the workpiece-positioning executing unit 24, which has received the position information, positions, on the basis of the position information, the machining reference part of the workpiece 5 in a predetermined position or any position where the machining reference part of the workpiece 5 does not collide with the machining-reference-part measuring unit 26. Thereafter, the measurement-positioning executing unit 25 positions the machining-reference-part measuring unit 26 in a measurement start position. Specifically, an example is conceivable in which, the rotating axis 1 of the workpiece fixing jig 41, which is the workpiece fixing unit 21, rotates to move the rake face 4 of the workpiece 5 to a predetermined position, then the touch sensor 6 is driven as the machining-reference-part measuring unit 26 and the touch-sensor elevating device is driven as the measurement-positioning executing unit 25 and, after the positioning of the workpiece 5 is completed, the touch sensor 6 is lowered to the measurement start position (see FIGS. 4A and 4B).

When the collision determining unit 23 determines that the machining reference part and the machining-reference-part measuring unit 26 do not collide with each other, the workpiece-positioning executing unit 24 does not perform the positioning. The measurement-positioning executing unit 25 positions the machining-reference-part measuring unit 26 in the measurement start position. Note that the predetermined position is a position where the machining reference part of the workpiece 5 does not collide with the machining-reference-part measuring unit 26 positioned in the measurement start position. The predetermined position is decided in advance. The measurement start position is also decided in advance.

After the machining-reference-part measuring unit 26 is positioned in the measurement start position, the machining-reference-part-measurement executing unit 27 executes a position measuring operation for the machining reference part of the workpiece 5. Specifically, an example is conceivable in which, when the rotating axis 1 of the workpiece fixing jig 41, which is the workpiece fixing unit 21, rotates and the rake face 4 of the workpiece 5 comes into contact with the touch sensor 6, the position of the rake face 4 is measured (see FIGS. 2A and 2B).

Figure 8:
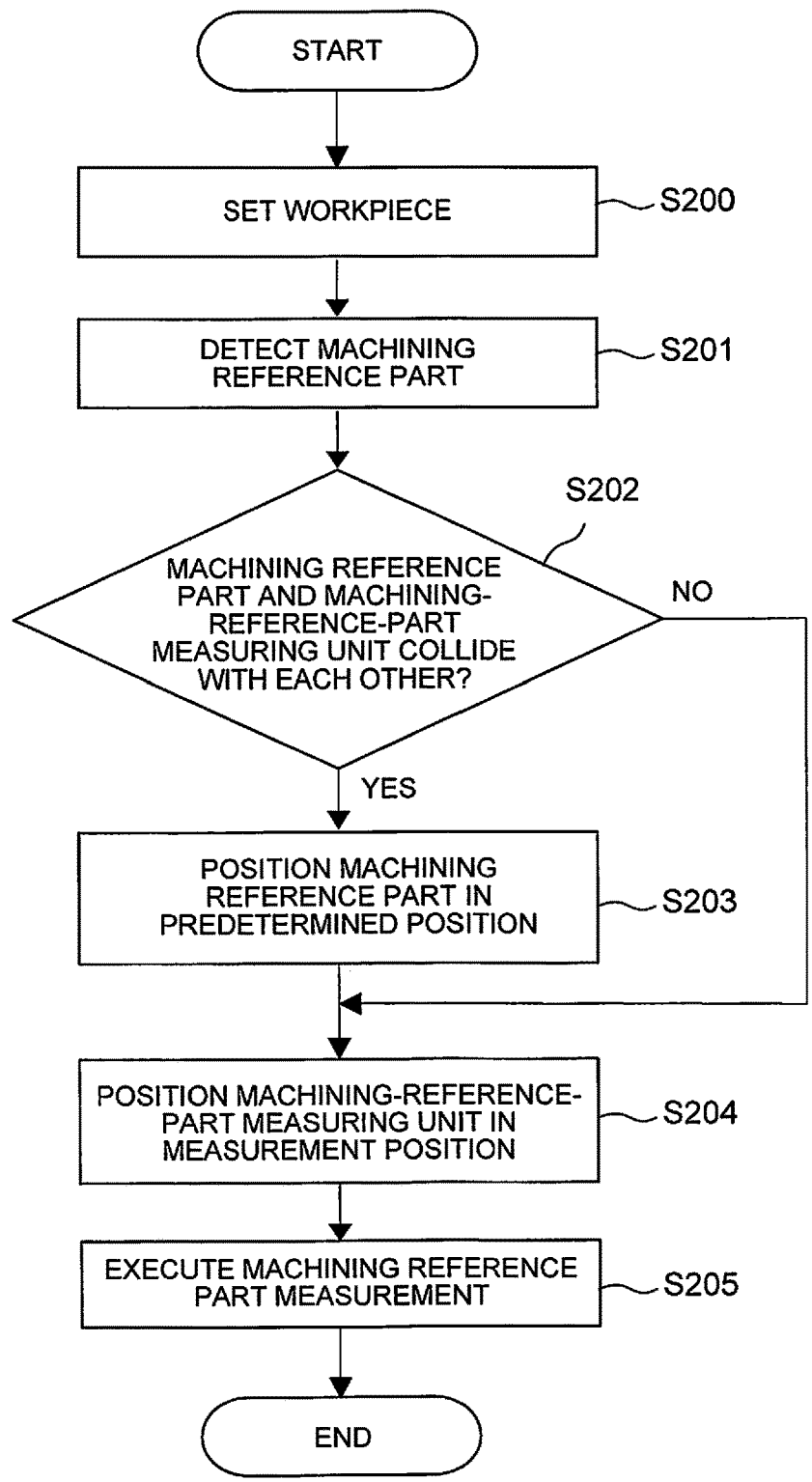
FIG. 8 is a diagram showing a flow of processing in the second embodiment.

FIG. 8 is a diagram showing a flow of processing in the second embodiment. The flow of the processing is explained below according to steps.

[S200] The wire electric discharge machine fixes, with the workpiece attaching and detaching unit 20, the workpiece 5 to the workpiece fixing unit 21. The wire electric discharge machine shifts to S201.

[S201] The wire electric discharge machine detects, with the machining-reference-part detecting unit 22, the position of the machining reference part of the workpiece 5. The wire electric discharge machine shifts to S202.

[S202] The wire electric discharge machine determines, with the collision determining unit 23, from the position of the machining reference part detected by the machining-reference-part detecting unit 22 and a predetermined measurement position positioned by the machining-reference-part measuring unit 26, whether the machining reference part and the machining-reference-part measuring unit 26 collide with each other. When determining that the machining reference part and the machining-reference-part measuring unit collide with each other, the wire electric discharge machine shifts to S203. When determining that the machining reference part and the machining-reference-part measuring unit 26 do not collide with each other, the wire electric discharge machine shifts to S204.

[S203] The wire electric discharge machine positions, with the workpiece-positioning executing unit 24, the machining reference part of the workpiece 5 in a predetermined position. The wire electric discharge machine shifts to S204.

[S204] The wire electric discharge machine positions, with the measurement-positioning executing unit 25, the machining-reference-part measuring unit 26 in the predetermined measurement position. The wire electric discharge machine shifts to S205.

[S205] The wire electric discharge machine causes, with the machining-reference-part-measurement executing unit 27, the machining-reference-part measuring unit 26 to measure the position of the machining reference part of the workpiece 5, and ends the processing.

Third Embodiment

Figure 10:
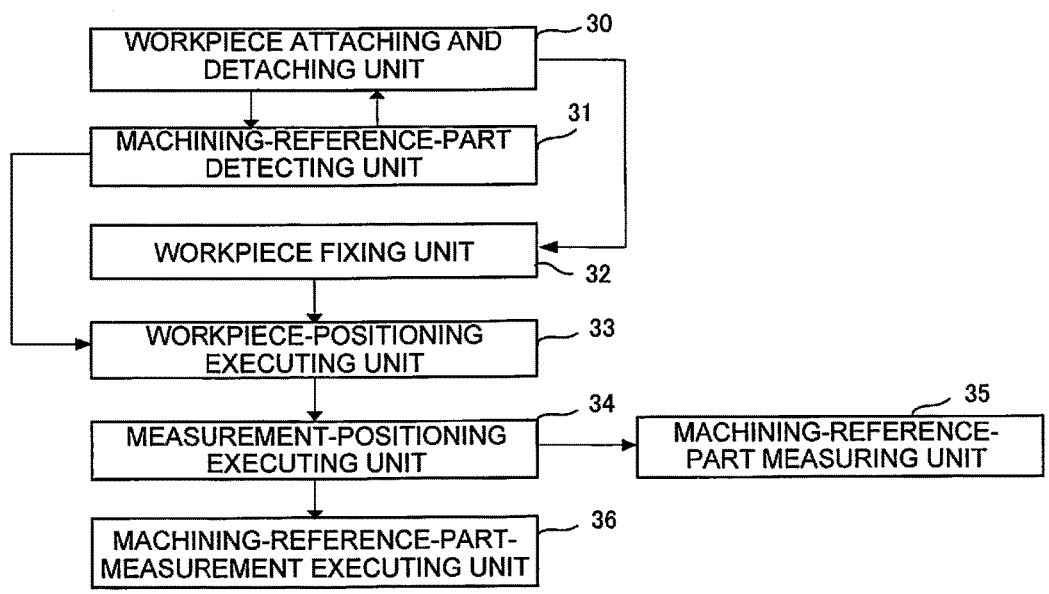
FIG. 10 is a block diagram showing a third embodiment.

FIG. 10 is a block diagram showing a third embodiment.

Workpiece attaching and detaching unit 30 positions the workpiece 5 in a predetermined detection position. After the workpiece 5 is positioned in the predetermined detection position, machining-reference-part detecting unit 31 detects the position of the machining reference part of the workpiece 5 positioned in the detection position and calculates the position of the machining reference part at the time when the workpiece 5 is set in workpiece fixing unit 32.

Specifically, the industrial robot 40 is used as the workpiece attaching and detaching unit 30 and the vision sensor 44 is used as the machining-reference-part detecting unit 31. First, the industrial robot 40 positions the workpiece 5 in a vision sensor detection position decided in advance. The workpiece 5 includes the machining reference part equivalent to the rake face 4 shown in FIG. 1. The vision sensor 44 photographs the workpiece 5 positioned in the detection position and detects the position of the rake face 4, which is a machining reference, from image data obtained by photographing the workpiece 5.

Figure 12A:
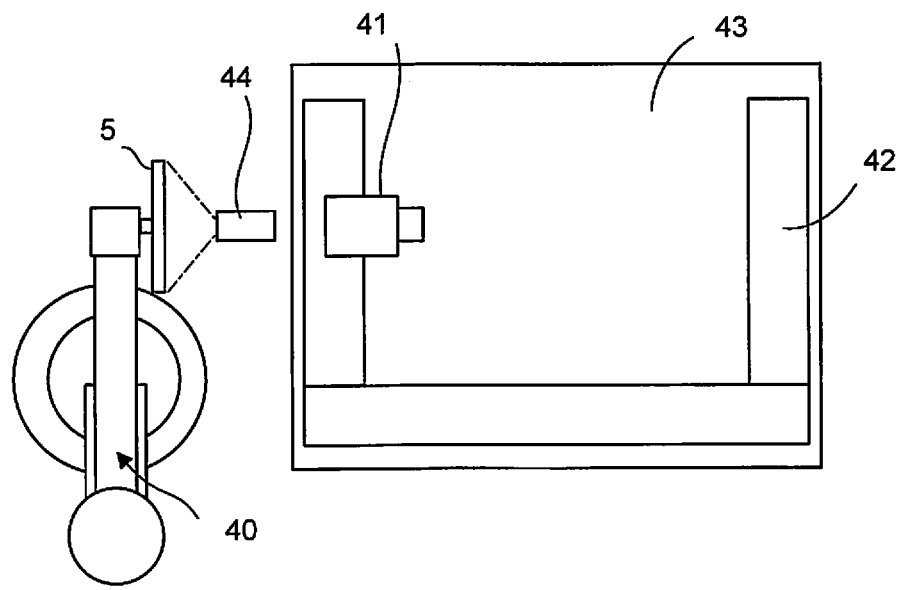
FIGS. 12A and 12B are diagrams for explaining the third embodiment.

An example is conceivable in which a difference between the position of the machining reference part in the detection position and the position of the machining reference part at the time when the workpiece 5 is set in the workpiece fixing unit 32 is decided in advance as a position shift amount and the vision sensor 44 calculates, from the position of the machining reference part of the workpiece 5 positioned in the detection position and the position shift amount, the position of the machining reference part at the time when the workpiece 5 is set in the workpiece fixing unit 32 (FIG. 12A). After detecting the position of the machining reference part, the machining-reference-part detecting unit 31 outputs information concerning the detected position of the machining reference part to the workpiece-positioning executing unit 33.

Figure 12B:
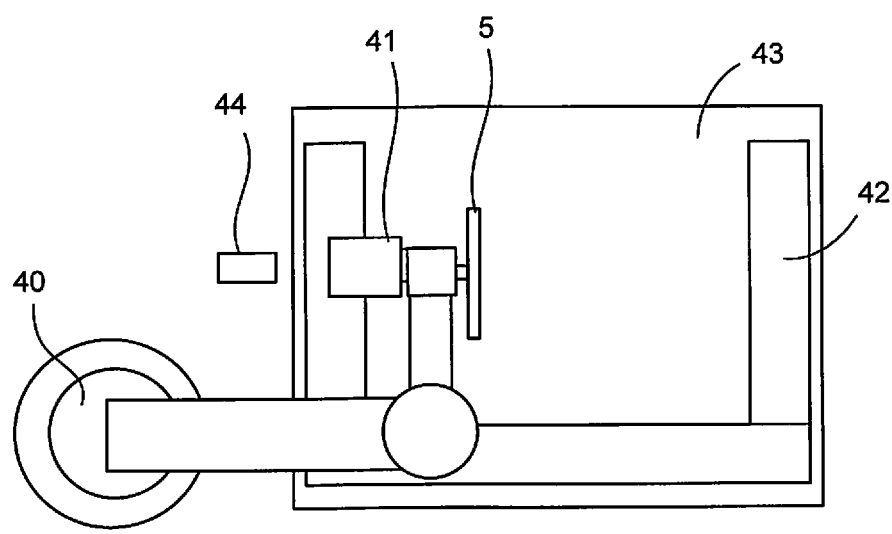

The workpiece fixing unit 32, which fixes and sets the workpiece 5, is placed on the table 42 of the wire electric discharge machine. After the detection of the machining reference part of the workpiece 5 ends, the workpiece attaching and detaching unit 30 attaches the workpiece 5 to the workpiece fixing unit 32 and sets the workpiece 5. Specifically, an example is conceivable in which the workpiece 5 is attached to the workpiece fixing jig 41, which is the workpiece fixing unit 32, placed on the table 42 using the industrial robot 40 (FIG. 12B). Note that the workpiece fixing jig 41 includes workpiece positioning unit like the rotating axis 1.

After the workpiece 5 is set in the workpiece fixing unit 32, the workpiece-positioning executing unit 33, which has received the position information, positions the machining reference part of the workpiece 5 in a predetermine position on the basis of the position information. Thereafter, measurement-positioning executing unit 34 positions machining-reference-part measuring unit 35 in a measurement start position. Specifically, an example is conceivable in which, after the industrial robot 40 attaches the workpiece 5 to the workpiece fixing jig 41, which is the workpiece fixing unit 32, the rotating axis 1 of the workpiece fixing jig 41 rotates to move the rake face 4 of the workpiece 5 to a predetermined position, then the touch sensor 6 is driven as the machining-reference-part measuring unit 35 and the touch-sensor elevating device is driven as the measurement-positioning executing unit 34 and, after the positioning of the workpiece is completed, the touch sensor 6 is lowered to the predetermined measurement start position (see FIGS. 4A and 4B).

Note that the predetermined position is a position where the workpiece 5 does not collide with the machining-reference-part measuring unit 35 positioned in the measurement start position. The predetermined position is decided in advance. The measurement start position is also decided in advance.

After the machining-reference-part measuring unit 35 is positioned in the measurement start position, the machining-reference-part-measurement executing unit 36 executes a position measuring operation for the machining reference part of the workpiece 5. Specifically, an example is conceivable in which, when the rotating axis 1 of the workpiece fixing jig 41, which is the workpiece fixing unit 32, rotates and the rake face 4 of the workpiece 5 comes into contact with the touch sensor 6, the position of the rake face 4 is measured (see FIGS. 2A and 2B).

Figure 11:
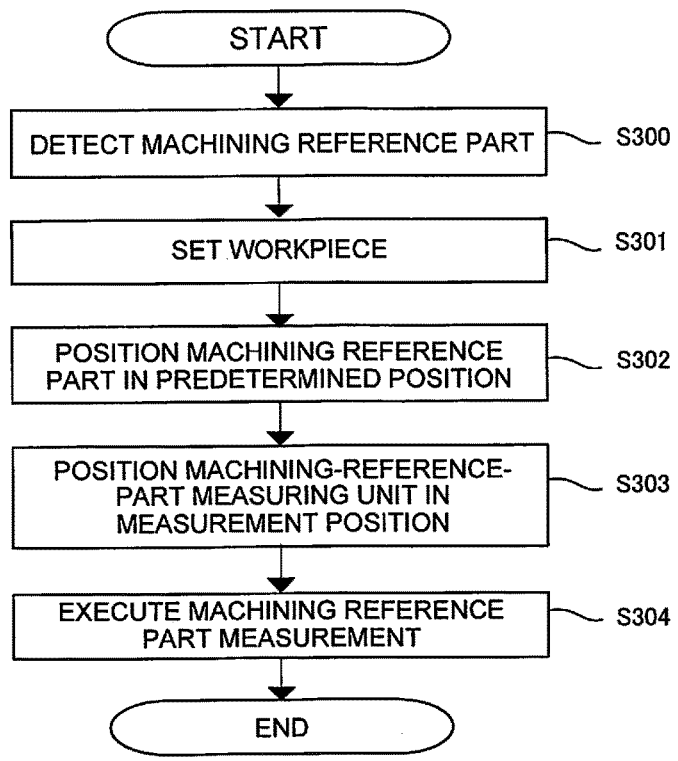
FIG. 11 is a diagram showing a flow of processing in the third embodiment.

FIG. 11 is a diagram showing a flow of processing in the third embodiment. The flow of the processing is explained below according to steps.

[S300] The wire electric discharge machine positions, with the workpiece attaching and detaching unit 30, the workpiece 5 in a predetermined detection position and detects, with the machining-reference-part detecting unit 31, the position of the machining reference part of the workpiece 5. The wire electric discharge machine shifts to S301.

[S301] The wire electric discharge machine fixes, with the workpiece attaching and detaching unit 30, the workpiece 5 to the workpiece fixing unit 32. The wire electric discharge machine shifts to S302.

[S302] The wire electric discharge machine positions, with the workpiece-positioning executing unit 33, the machining reference part of the workpiece 5 in a predetermined position. The wire electric discharge machine shifts to s303.

[S303] The wire electric discharge machine positions, with the measurement-positioning executing unit 34, the machining-reference-part measuring unit 35 in the predetermined measurement position. The wire electric discharge machine shifts to S304.

[S304] The wire electric discharge machine causes, with the machining-reference-part-measurement executing unit 36, the machining-reference-part measuring unit 35 to measure the position of the machining reference part of the workpiece 5, and ends the processing.

The embodiments of the present invention are explained above. However, the present invention is not limited to the examples of the embodiments explained above. The present invention can be carried out in other modes by changing the embodiments as appropriate.

What is claimed is:

1. A wire electric discharge machine configured to perform machining of a workpiece in a work tank, the wire electric discharge machine comprising:
    a workpiece fixing unit disposed in the work tank and including a movable axis to which the workpiece is detachably attached;
    a machining-reference-part detecting unit configured to detect a position of a machining reference part of the workpiece detachably fixed to the workpiece fixing unit;
    a controller configured to automatically control the movable axis, on the basis of position information of the machining reference part detected by the machining-reference-part detecting unit, to position the machining reference part in a predetermined position;
    a machining-reference-part measuring unit configured to measure an error of the machining reference part of the workpiece detachably fixed to the workpiece fixing unit; and
    a measurement-positioning executing unit for positioning the machining-reference-part measuring unit in a predetermined measurement position,
    wherein the predetermined position of the machining reference part is a position where the machining reference part does not collide with the machining-reference-part measuring unit positioned in the predetermined measurement position,
    wherein the machining-reference-part measuring unit is configured to perform measurement of the machining reference part of the workpiece when the machining reference part is in the predetermined position and the machining-reference-part measuring unit is in the predetermined measurement position, and
    wherein the controller is configured to automatically control the wire electric discharge machine to perform machining of the workpiece based on the measurement of the machining reference part of the workpiece.

2. The wire electric discharge machine according to claim 1, wherein the movable axis is controlled to position the workpiece by positioning the machining reference part detected by the machining-reference-part detecting unit in the predetermined position.

3. The wire electric discharge machine according to claim 1, wherein the machining-reference-part detecting unit is a vision sensor.

4. The wire electric discharge machine according to claim 1, further comprising:
    a workpiece attaching and detaching unit configured to attach and detach the workpiece to and from the movable axis of the workpiece fixing unit, wherein
    the workpiece attaching and detaching unit includes the machining-reference-part detecting unit.

5. The wire electric discharge machine according to claim 4, wherein, after the workpiece attaching and detaching unit attaches the workpiece to the movable axis of the workpiece fixing unit, the machining-reference-part detecting unit is configured to detect the position of the machining reference part of the workpiece.

6. The wire electric discharge machine according to claim 4, wherein, before the workpiece attaching and detaching unit attaches the workpiece to the movable axis of the workpiece fixing unit, the machining-reference-part detecting unit is configured to
    detect the position of the machining reference part of the workpiece, and
    calculate, from the detected position of the machining reference part, the position of the machining reference part of the workpiece at a time when the workpiece is attached to the movable axis of the workpiece fixing unit.

7. The wire electric discharge machine according to claim 1, further comprising:
    a workpiece attaching and detaching unit configured to attach and detach the workpiece to and from the movable axis of the workpiece fixing unit, wherein
    after the workpiece attaching and detaching unit attaches the workpiece to the movable axis of the workpiece fixing unit, the machining-reference-part detecting unit is configured to detect the position of the machining reference part of the workpiece.

8. The wire electric discharge machine according to claim 1, further comprising:
    a workpiece attaching and detaching unit configured to attach and detach the workpiece to and from the movable axis of the workpiece fixing unit, wherein
    before the workpiece attaching and detaching unit attaches the workpiece to the movable axis of the workpiece fixing unit, the machining-reference-part detecting unit is configured to
    detect the position of the machining reference part of the workpiece, and
    calculate, from the detected position of the machining reference part, the position of the machining reference part of the workpiece at a time when the workpiece is attached to the movable axis of the workpiece fixing unit.

* * * * *